United States Patent
Wilson

(10) Patent No.: US 10,171,015 B2
(45) Date of Patent: Jan. 1, 2019

(54) DIGITAL MOTOR CONTROL UNIT

(71) Applicant: Thales Holdings UK Plc, Surrey (GB)

(72) Inventor: Graham Wilson, Belfast (GB)

(73) Assignee: THALES HOLDINGS UK PLC, Surrey (GB)

( * ) Notice: Subject to any disclaimer, the term of this patent is extended or adjusted under 35 U.S.C. 154(b) by 340 days.

(21) Appl. No.: 15/042,702

(22) Filed: Feb. 12, 2016

(65) Prior Publication Data

US 2016/0241175 A1 Aug. 18, 2016

(30) Foreign Application Priority Data

Feb. 13, 2015 (GB) .................................. 1502384.9

(51) Int. Cl.
| | | |
|---|---|---|
| *G01M 1/38* | (2006.01) | |
| *G05B 13/00* | (2006.01) | |
| *G05B 15/00* | (2006.01) | |
| *G05D 23/00* | (2006.01) | |
| *H02P 6/16* | (2016.01) | |
| *H02P 6/10* | (2006.01) | |
| *H02P 21/00* | (2016.01) | |
| *G05B 15/02* | (2006.01) | |

(52) U.S. Cl.
CPC .................. *H02P 6/16* (2013.01); *G05B 15/02* (2013.01); *H02P 6/10* (2013.01); *H02P 21/00* (2013.01)

(58) Field of Classification Search
CPC ... H02P 6/16; H02P 6/10; H02P 21/00; G05B 15/02
See application file for complete search history.

(56) References Cited

U.S. PATENT DOCUMENTS 5,744,926 A * 4/1998 Lai .................... G05B 11/26
                                                          318/590
2006/0100723 A1   5/2006 Sun et al.
(Continued)

FOREIGN PATENT DOCUMENTS

CN       102291062 A    12/2011
CN       102761299 A    10/2012
(Continued)

OTHER PUBLICATIONS

Combined Search and Examination Report for UK Application No. GB1502384.9, dated Aug. 21, 2015.
European Search Report for EP16155075, dated Jul. 29, 2016.

*Primary Examiner* — Toan K Le
(74) *Attorney, Agent, or Firm* — Hauptman Ham, LLP

(57) ABSTRACT

Control of a plurality of electronically commutated motors is effected using a control unit and a power unit. The power unit enables the provision of commutation signals to each controlled motor. The control unit comprises a DSP and a FPGA. An input memory of the FPGA is mapped to the DSP. In use, the DSP determines motor repositioning signals, on the basis of a received motor position demand signal describing demanded motor positions and the encoded motor position data, and loads the motor repositioning signals into the input memory of the FPGA. The FPGA is operable to generate motor driving current signals for driving the motors into the demanded motor positions, on the basis of the motor repositioning signals and motor phase current samples collected by the power unit, and to output the motor driving current signals to the power unit.

8 Claims, 9 Drawing Sheets

(56) References Cited

U.S. PATENT DOCUMENTS

| | | | | |
|---|---|---|---|---|
| 2007/0040520 A1* | 2/2007 | De Filippis | ............. | H02P 6/182 318/400.04 |
| 2007/0189739 A1* | 8/2007 | Dufner | ...................... | H02P 6/28 388/801 |
| 2011/0025237 A1* | 2/2011 | Wystup | ................ | H02M 5/458 318/400.02 |
| 2014/0300300 A1* | 10/2014 | Winker | .................... | H02P 6/14 318/400.09 |

FOREIGN PATENT DOCUMENTS

| | | |
|---|---|---|
| CN | 104238420 A | 12/2014 |
| EP | 1871000 A1 | 12/2007 |

\* cited by examiner

DIGITAL MOTOR CONTROL UNIT

This application claims priority benefit to United Kingdom Application No. GB1502384.9, filed Feb. 13, 2015, which is hereby incorporated herein by reference in its entirety.

FIELD

Embodiments described herein relate generally to a motor control unit suitable for controlling several digital motors.

BACKGROUND

Brushless motors are used in a variety of different implementations, for example for controlling automotive and/or robotic movement of an electromechanical device. Three-phase brushless motors are particularly useful, since they can provide reliable and smooth running.

While it is possible to design an electromechanical device using one or two brushless motors, some mechanical implementations seek further degrees of freedom, for which further such motors may be required. A mechanical implementation using three brushless motors is the subject of the present disclosure, but the reader will appreciate that this does not place a limitation on the disclosure.

Field oriented control (FOC) is a commutation technique used for controlling brushless motors. It is well known that FOC can be computationally intensive. FOC of a brushless motor can be achieved through the use of a digital signal processor (DSP).

Existing DSPs enable control of up to two brushless motors. This limitation takes account of the fact that, in many implementations, other tasks may arise in a mechanical device which require control. The processing capability of the provided DSP will generally be the most effective way of carrying out these additional control tasks. As such, the DSP will not be wholly devoted to FOC of motors.

This limitation on the capabilities of the DSP takes two forms. Firstly, the capacity of the DSP to execute software instructions will, inevitably, have a limit. It has been found that FOC of three brushless motors, within the bounds of present-day DSPs, may exceed this limit. Secondly, DSPs can generally only drive a finite number of outputs. If a motor is driven by pulse wave modulation (PWM) signals, normally six PWM drive signals are required per motor. Driving three brushless motors will thus impose a requirement for drive signals which can be greater than the number of outputs capable of being driven by a DSP.

Furthermore, in many electromechanical applications, there is a desire for miniaturisation. One approach to the above limitations imposed by a DSP, is to provide more than one DSP per controller. However, If a plurality of DSPs is required in order to control electromotive components of the device, miniaturisation can be, at best, incomplete.

DESCRIPTION OF SPECIFIC EMBODIMENTS

Figure 1:
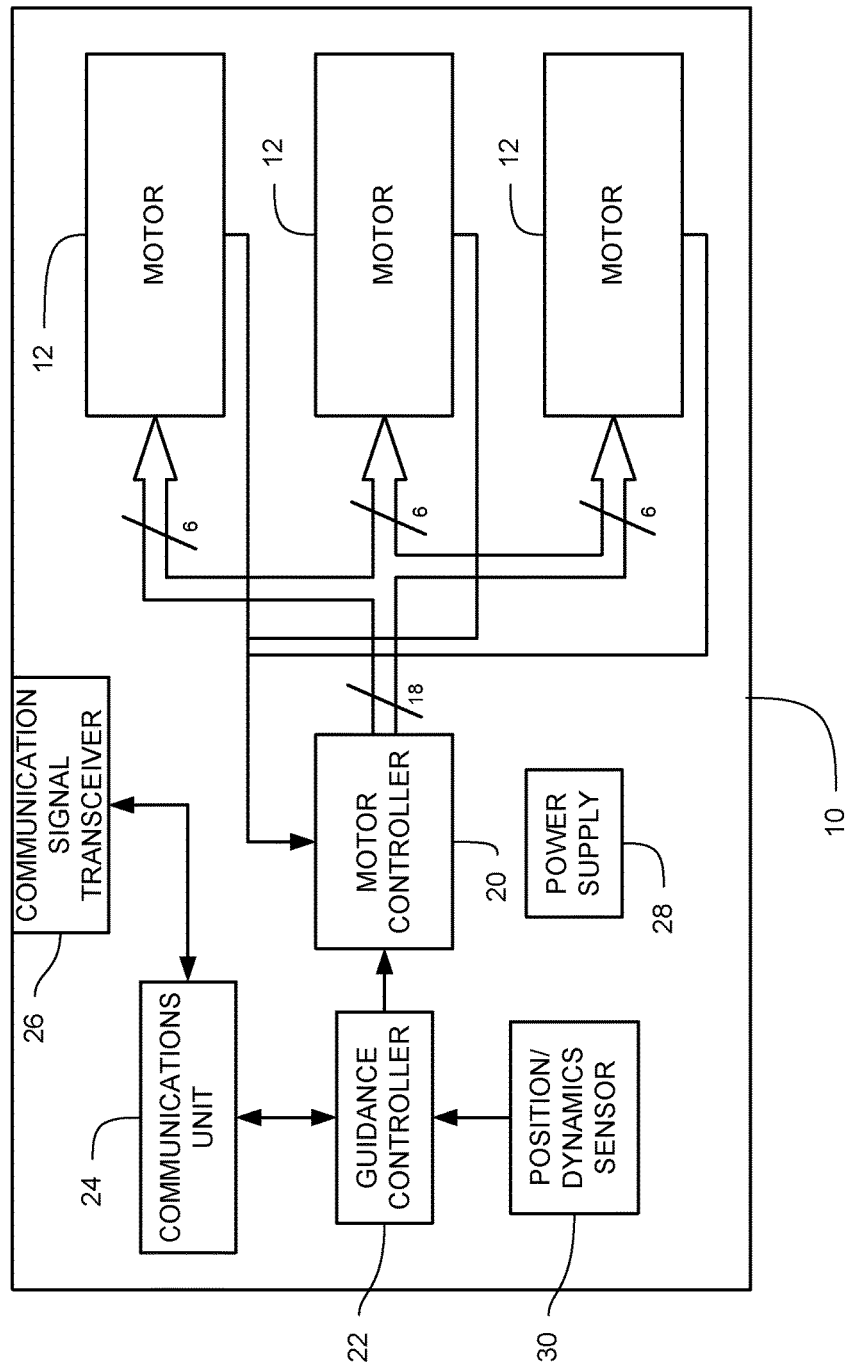
FIG. 1 is a schematic diagram of an electromechanical device in accordance with a described embodiment.

In general terms, an embodiment described herein provides control of a plurality of electronically commutated motors using a control unit and a power unit. The power unit enables the provision of commutation signals to each controlled motor. The control unit comprises a DSP and a FPGA. An input memory of the FPGA is mapped to the DSP. In use, the DSP determines motor repositioning signals, on the basis of a received motor position demand signal describing demanded motor positions and the encoded motor position data, and loads the motor repositioning signals into the input memory of the FPGA. The FPGA is operable to generate motor driving current signals for driving the motors into the demanded motor positions, on the basis of the motor repositioning signals and motor phase current samples collected by the power unit, and to output the motor driving current signals to the power unit.

An embodiment described herein provides a controller for controlling a plurality of electronically commutated motors, comprising a control unit and a power unit, the power unit comprising a motor phase current sampler operable to provide, to the control unit, motor phase current samples from motor phase currents of the motors, a motor position encoder operable to provide, to the control unit, encoded motor position data for angular positions of the motors, and a plurality of drivers, each driver being operable to generate commutation signals, on the basis of respective motor driving current signals, the control unit comprising a digital signal processor, DSP, and a field programmable gate array, FPGA, having an input memory mapped to the DSP, the DSP being operable to determine motor repositioning signals, on the basis of a received motor position demand signal describing demanded motor positions and the encoded motor position data, and to load the motor repositioning signals into the input memory of the FPGA, and the FPGA being operable to generate motor driving current signals for driving said motors into said demanded motor positions, on the basis of the motor repositioning signals and the motor phase current samples, and to output said motor driving current signals to the power unit.

Another embodiment provides a method of controlling a plurality of electronically commutated motors, comprising a control process and a power process, the power process comprising providing, to the control process, motor phase current samples from motor phase currents of the motors, providing, to the control process, encoded motor position data for angular positions of the motors, and generating, for each controlled motor, commutation signals, on the basis of respective motor driving current signals, the control process comprising mapping an input memory of a field programmable gate array, FPGA, to a digital signal processor, DSP, determining, by the DSP, motor repositioning signals, on the basis of a received motor position demand signal describing demanded motor positions and the encoded motor position data, and loading the motor repositioning signals into the input memory of the FPGA, and generating, by the FPGA, motor driving current signals to drive the motors into the demanded motor positions, on the basis of the motor repositioning signals and the motor phase current samples, and outputting the motor driving current signals to the power process.

As illustrated in FIG. 1, an electromechanical device 10 comprises three brushless motors 12, each of which is electronically commutated by a motor controller 20. The motor controller 20 acts under the direction of a guidance controller 22, which sends guidance instructions to the motor controller 20 as required. The guidance controller 22 is in communication with a communications unit 24 which, via a communication signal transceiver 26 enables communication with an outside entity for the provision of guidance commands as appropriate. The guidance controller 22 also avails itself of information provided by a position/dynamics sensor 30 in establishing what guidance instructions should be passed to the motor controller 20 in response to guidance commands received by the guidance controller 22.

As will be appreciated by the reader, a power supply 28 is also provided in the electromechanical device 10. Connections from the power supply 28 to the various components already described are not illustrated in FIG. 1 for reasons of clarity.

Each motor 12 can be mechanically connected to mechanisms, to impart torque and thus to move those mechanisms as required.

Each brushless motor 12 also feeds back information to the motor controller 20. To achieve this, each brushless motor 12 incorporates a rotational encoder (not shown) which produces digital information describing the position of the rotor of the motor 12. The nature of this information will be described in due course, in describing the structure and function of the motor controller 20.

While it might be imagined by the reader that, in order to control three brushless motors, a driver be provided for each motor, and a controller be provided separately to control all of the drivers, the present disclosure sets forth that, by separating functions in a different way, a more concise arrangement can be provided. This provides an opportunity for incorporation of the control aspects of the electromechanical device into a smaller space, and thus for miniaturisation of the device as a whole.

Figure 2:
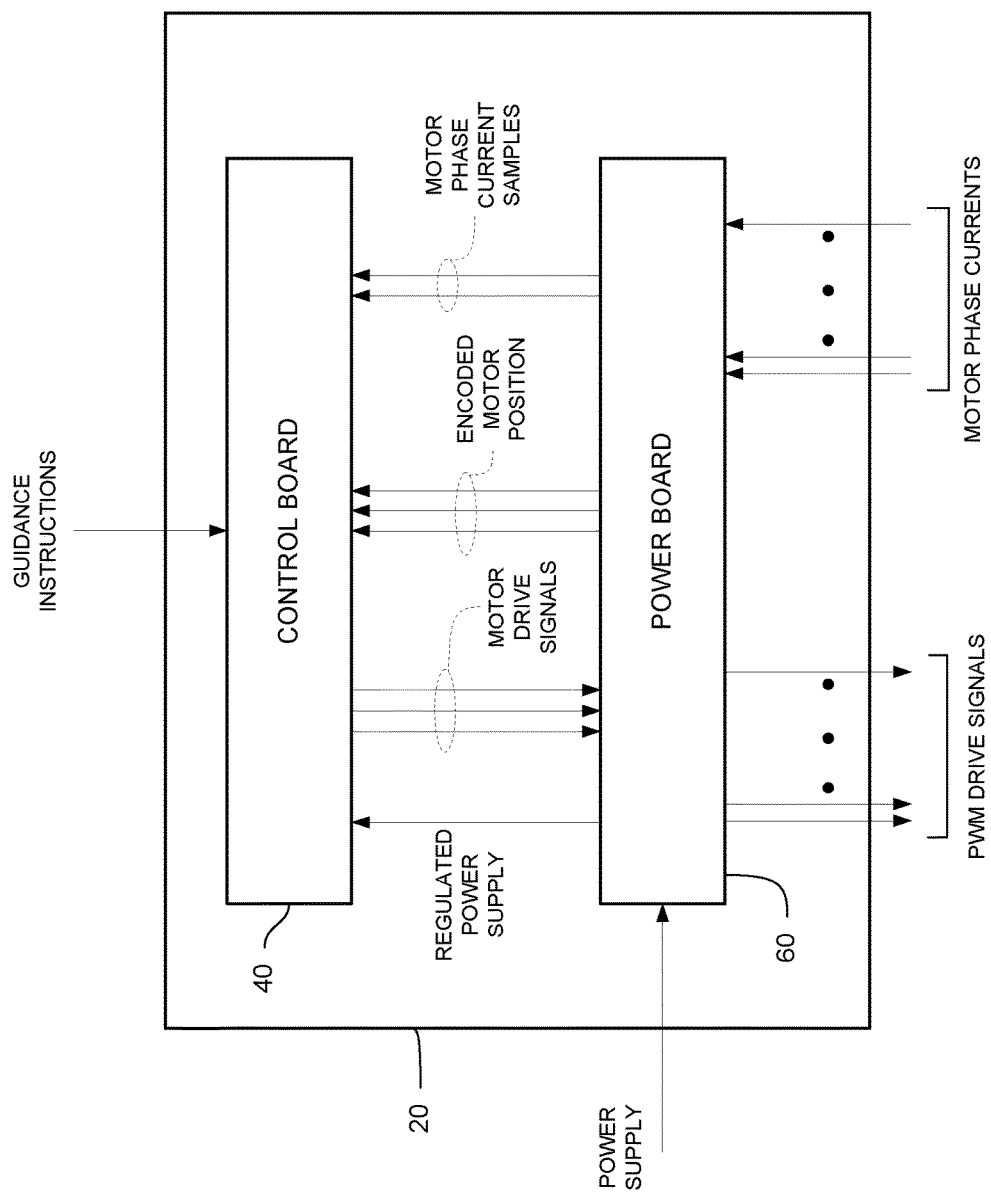
FIG. 2 is a schematic diagram of a motor controller of the device illustrated in FIG. 1.

As shown in FIG. 2, the motor controller 20 has a structure which separates digital control and processing from the generation of motor driving signals. This allows for achievement of a significantly compact structure.

The motor controller 20 comprises two main components. These are, in a specific arrangement, embodied as separate printed circuit boards. A control board 40 takes, as an input, guidance instructions from the guidance controller 22, and processes these in light of information received from a power board 60 concerning the condition and performance of the brushless motors 12. In particular, the power board 60 sends motor drive signals to the motors 12 in a recognised format such as PWM. In response, the power board 60 monitors motor phase current signals which provide a response as to the mechanical function of the motors 12 with respect to the input signals. As will be understood, the transfer function, with respect to input signals, will not necessarily be consistent from one motor to another.

From this information, the power board 60 feeds back to the control board 40 encoded digital signals indicating the position of each motor 12, and signals representing samples of phase currents for each of the motors 12. From all of this information, the control board 40 is able to perform field oriented control of the motors 12.

Field oriented control is effected by the forwarding by the control board 40 of motor drive signals to the power board 60. These are translated into the PWM drive signals previously mentioned.

Also notable is the use of the power board 60 to provide a regulated power supply to the control board 40. This enables separation of all high power functions away from the processing functionality of the control board 40.

Figure 3:
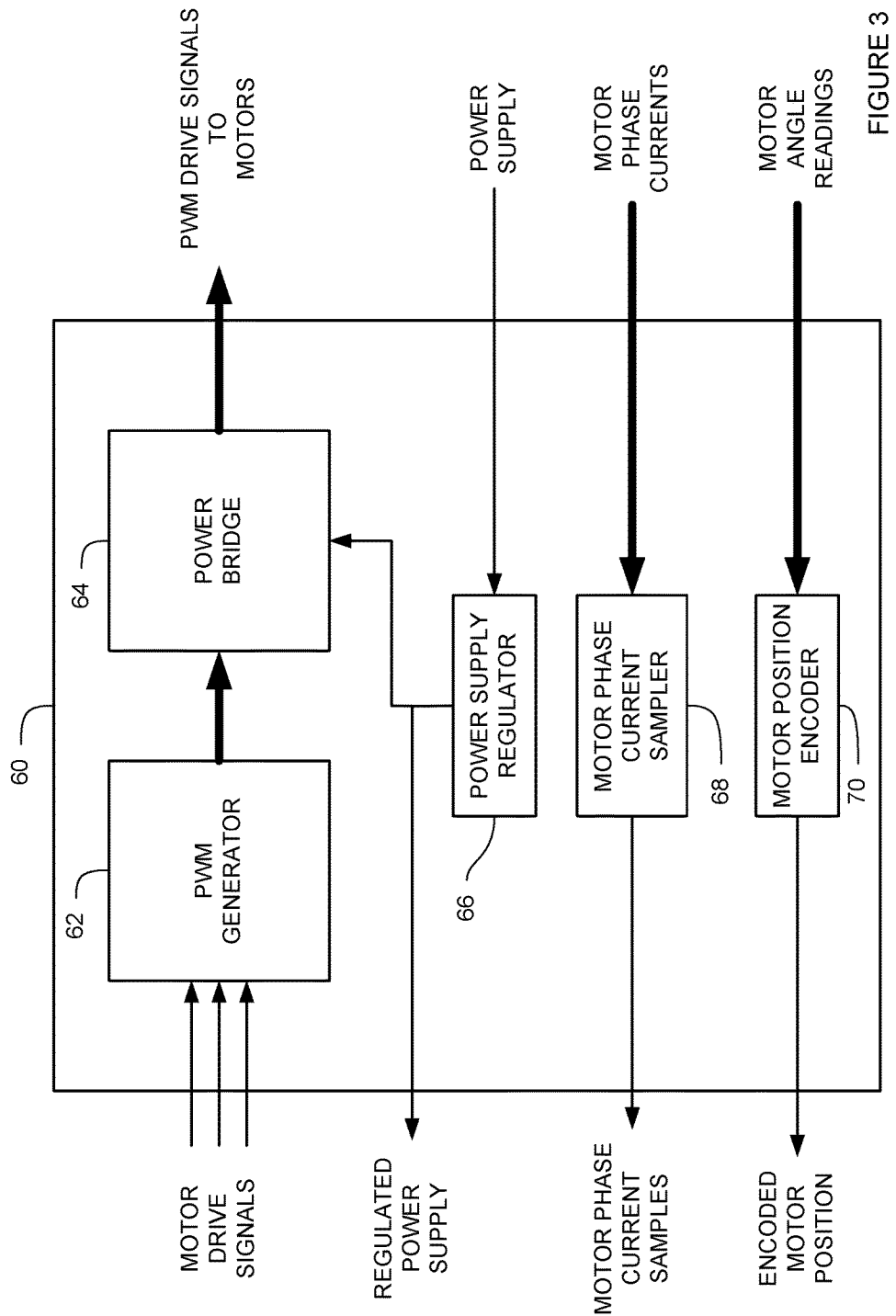
FIG. 3 is a schematic diagram of a power board of the motor controller illustrated in FIG. 2.

As illustrated in FIG. 3, the power board 60 receives the motor drive signals produced by the control board 40, and converts these into PWM commutation outputs. This is achieved by way of a PWM generator 62 and a power bridge 64. The power bridge 64, in particular, is provided with a regulated power supply by a power supply regulator 66, which also provides a regulated power supply to the control board 40.

The power board 60 further comprises a motor phase current sampler 68 and a motor position encoder 70. The motor phase current sampler 68 receives phase current signals from the motors 12 and samples these so as to provide sufficient information to the control board 40 to enable the control board 40 to conduct its control function.

The question as to the sufficiency of this information is inevitably implementation specific. The key requirement is to enable the control board 40 to perform control on the basis of adequate information, but not to exceed this information level to the extent that the control board 40 becomes "flooded" with information. Further, there may be a practical limit to the number of pin connections available between the power board 60 and the control board 40, which again imposes a cap on the amount of information that can and should be delivered.

The motor position encoder 70 encodes rotor position information received from each motor 12 as to the rotor position thereof, so that this information can be fed to the control board. Encoding by the motor position encoder 70 may provide an opportunity to reduce the bandwidth requirement for imparting this information to the control board 40. It will be appreciated that there will be a relationship between present and past readings to the extent that a stream of motor angle readings may be readily compressed in a lossless manner. In particular, the stream may lend itself to Delta encoding, possibly with Huffman coding for further compression if required.

Figure 4:
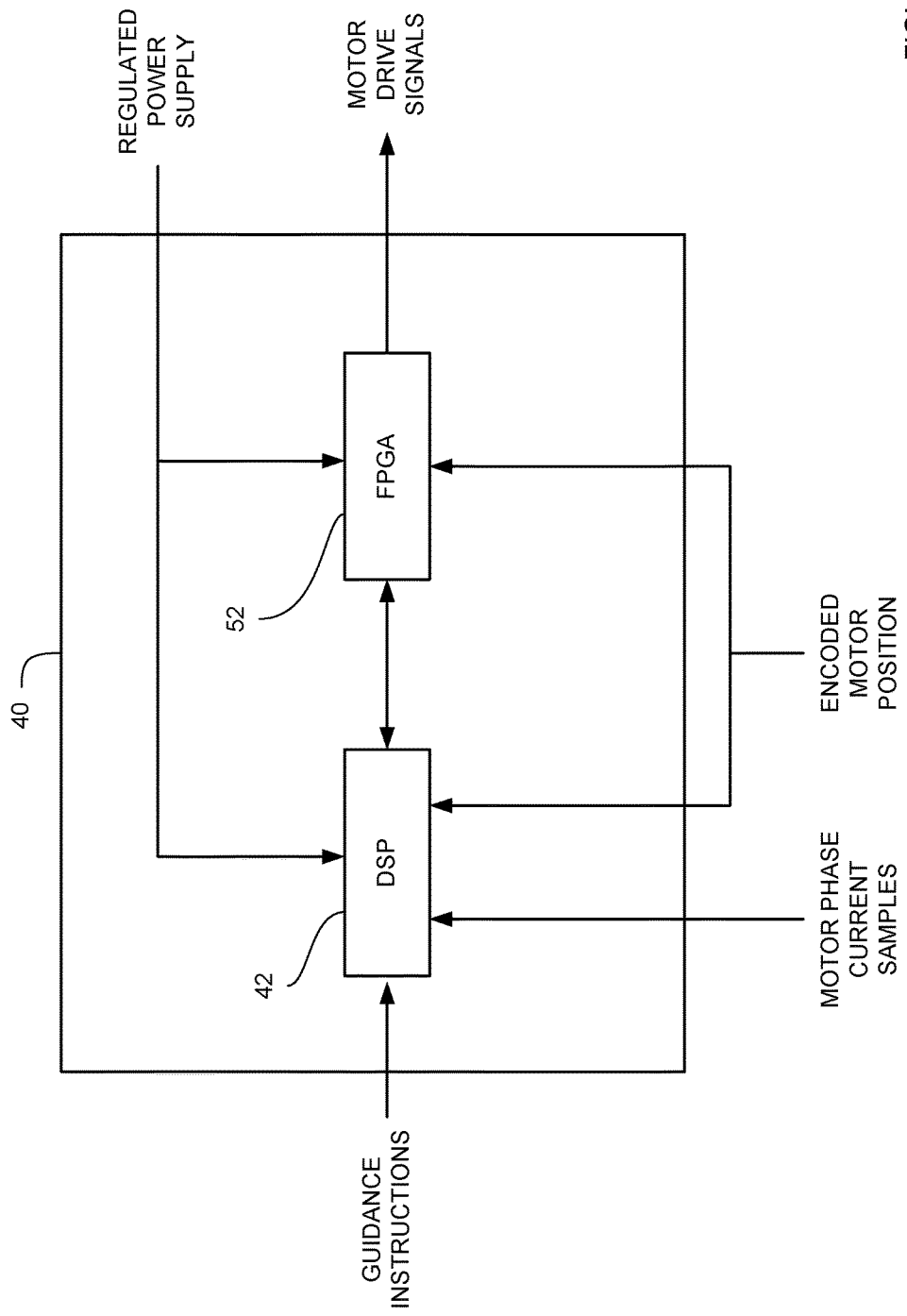
FIG. 4 is a schematic diagram of a control board of the motor controller illustrated in FIG. 2.

The control board 40 is illustrated in further detail in FIG. 4. The control board 40 comprises two distinct processing capabilities, namely a digital signal processor 42 and a field programmable gate array (FPGA) 52. Associated subsidiary components are omitted from FIG. 3 for clarity. The presented design is arranged in this way to take advantage of the particular strengths of these two processing components.

Specifically, a DSP is used by virtue of its flexibility and adaptability to different processing requirements. As well as performing some primary functions of the field oriented control process, the DSP could also implement other parts of the arrangement shown in FIG. 1, such as guidance control and some aspects of communications. On the other hand, the FPGA provides a specialised unit capable of making computations significantly more quickly than in the DSP.

In general terms, the DSP 42, which is a piece of hardware configured by software, effects measurement of motor phase currents and battery supply voltage, performs motor position control algorithms in respect of each of the controlled motors, transfer of data to and from the guidance controller 22, communication with the FPGA 52 via a memory mapped interface, and performance of angular position control algorithms, as required, for the electromechanical device.

In similarly general terms, the FPGA 52, which is best considered as firmware, performs initialisation of the DSP 42, reading of absolute encoders and incremental encoders which monitor motor condition and position, reading of other measurement units relating to position and or condition of the motors or the like mechanical device as a whole, execution of current control algorithms for production of control signals for the motors 12, and general hardware protection routines designed to avoid failure of the control electronics.

Figure 5:
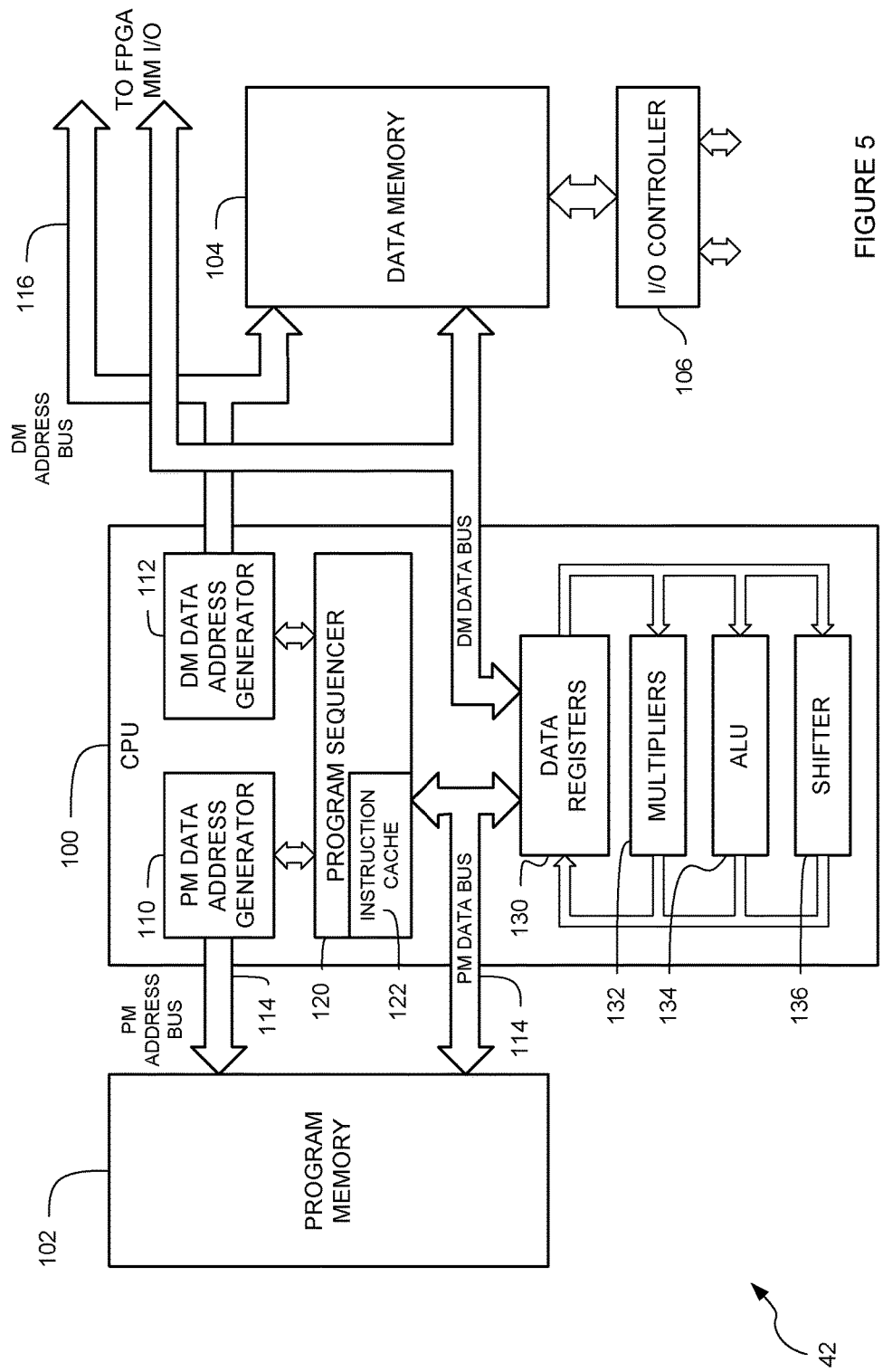
FIG. 5 is a schematic diagram of a digital signal processor of the control board illustrated in FIG. 4.

FIG. 5 illustrates the architecture of the DSP 42, to enable further understanding. The arrangement is based, to some extent, on generally available generic architectures of DSPs. The DSP 42 comprises a central processing unit (CPU) 100, and distinct memories namely a program memory 102 and a data memory 104.

An input/output (I/O) controller 106 provides external access to data stored in the data memory 104. This I/O controller is the main recipient of signals received from the power board 60 and offers also a USB connection to allow analysis, configuration and programming of the DSP 42 as required.

The CPU 100 comprises a program memory (PM) data address generator 110 and a corresponding data memory (DM) data address generator 112. These each cooperate with their respective memories 102, 104, using respective address buses 114, 116. by sending addresses thereto to enable data to be written to or read from the memories as required. The reader will see that the DM data address generator 112 is also indicated to map to addresses not contained in the data memory 104, but assigned to memory facilities of the FPGA, to be described in due course. This allows for memory mapping with the FPGA, and thus provides a means of communication between the DSP and the FPGA.

A program sequencer 120 draws program instructions from the program memory 102 by addressing through the PM data address generator 110 via the PM address bus 114. Program instructions are retrieved via a program memory data bus 118. An instruction cache 122 stores a number (for example, 30) of the most recently executed program instructions so that, if such program instructions are re-used, they can be retrieved most readily. This is a useful provision in a DSP configured to perform a looping function, where re-use of program instructions is likely to arise.

The CPU further comprises a plurality of data registers 130, and calculation facilities, namely a plurality of multipliers 132, an arithmetic logic unit 134 and a shifter 136. Each of these, whose respective functions will be readily understood, is useful in the performance of intensive calculations associated with DSP functionality. These are connected to each other internally of the CPU so that data can be presented to the calculation facilities 132, 134, 136 from the data registers 130 and the results of calculations can then be stored in the data registers 130.

A data memory (DM) data bus 140 then provides a facility for transfer of data between the data registers 130 and either the data memory 104 or the memory mapping facility of the FPGA (to be described).

Figure 6:
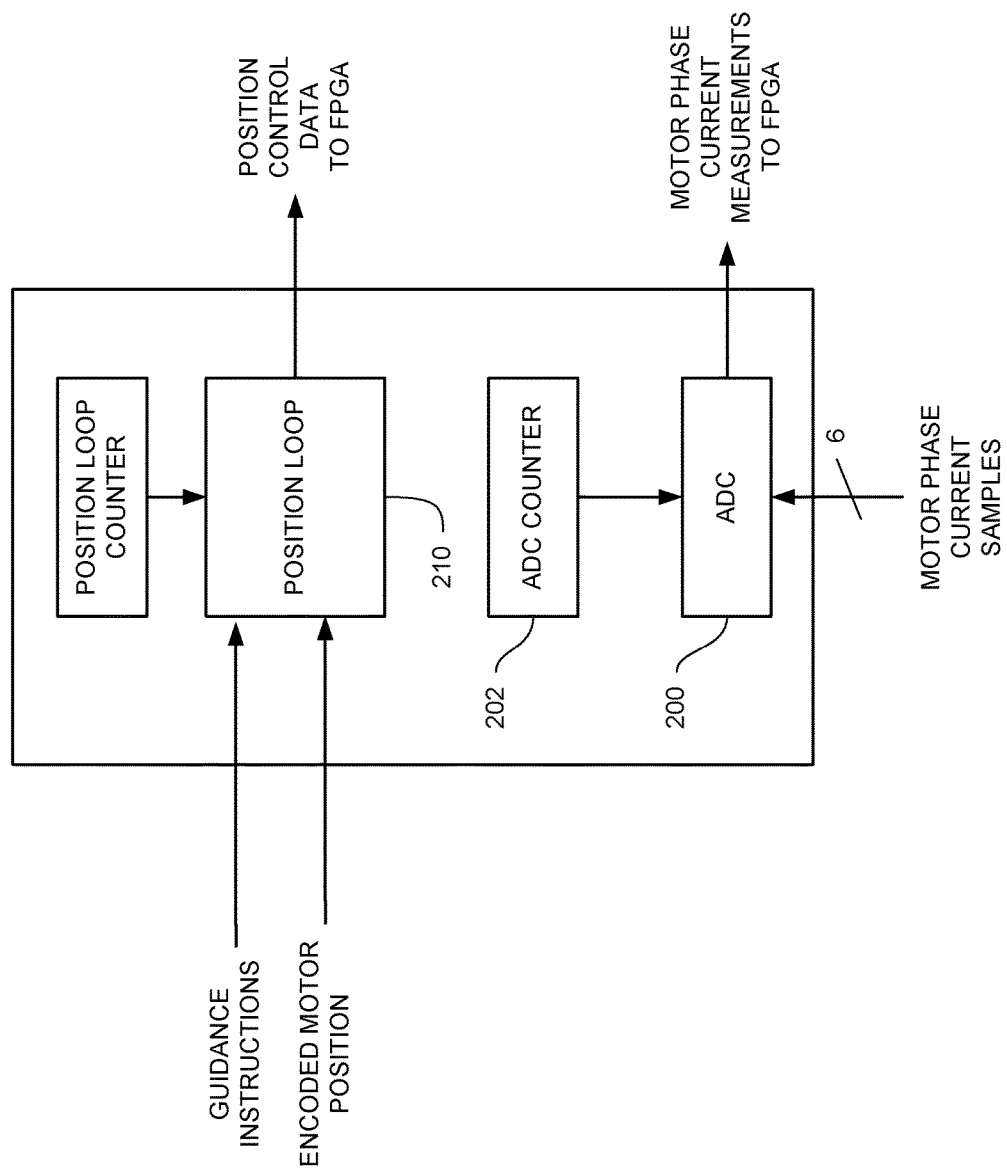
FIG. 6 illustrates functions implemented on the digital signal processor illustrated in FIG. 5.

The function of the DSP 42 is governed by the content of the program memory 102. On initialisation, the DSP 42 draws program instructions from the program memory 102 and executes them to perform a desired function. FIG. 6 illustrates the function of the DSP 42 in this embodiment.

The function, in general terms, has two parts. A first part provides an analogue to digital conversion facility, embodied as ADC 200, governed by an ADC counter 202. The ADC 200 receives, as its input, the motor phase current samples presented from the power board 60. It then presents digitised motor phase current measurements to the FPGA, via the memory mapped interface thereof, to be described in due course.

In addition, a second part of the function comprises a looping control function, embodied as a position loop 210. The position loop 210 is itself governed by a position loop counter 212, which is set to a speed 20% of that of the ADC counter 202. Thus, for instance, if the ADC counter 202 is set to count at a rate of 10 MHz, the position loop counter 212 is set to 2 MHz.

The position loop 210 calculates position control data for each motor to be controlled. If the position control data are expressed as a vector p, then:

$$p = P(d,m)$$

where d is a vector expressing the demanded rotor angles for the motors and m is a vector representing the existing motor position. m is evidently derivable from the encoded motor position data received from the power board 60. d is received in the guidance instructions from the guidance controller 22. The function P is a relatively straightforward arithmetic vector function, which takes the present motor position data, and delivers position control data defining how the motors are to be activated to achieve the demanded rotor angles.

Figure 7:
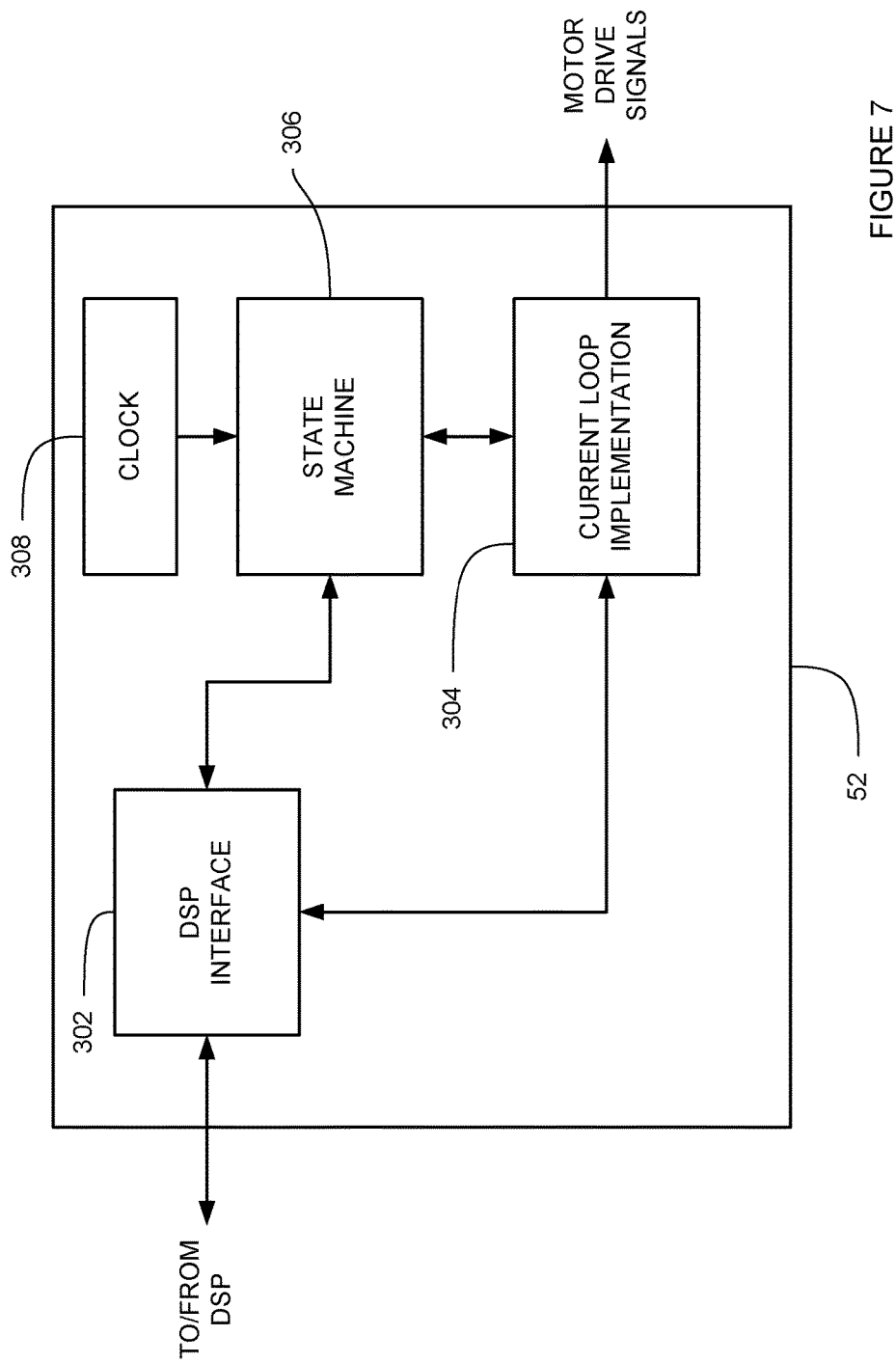
FIG. 7 illustrates implementation of a field programmable gate array of the control board illustrated in FIG. 4.

As shown in FIG. 7, the function of the DSP 42 and the FPGA 52 are interlinked by way of a DSP interface 302. The DSP interface 302 is a memory facility defined in the FPGA 52, which can be addressed directly by the DSP. Further, data stored in the DSP interface 302 can be retrieved by logical functional units of the FPGA 52, as will now be described.

Figure 8:
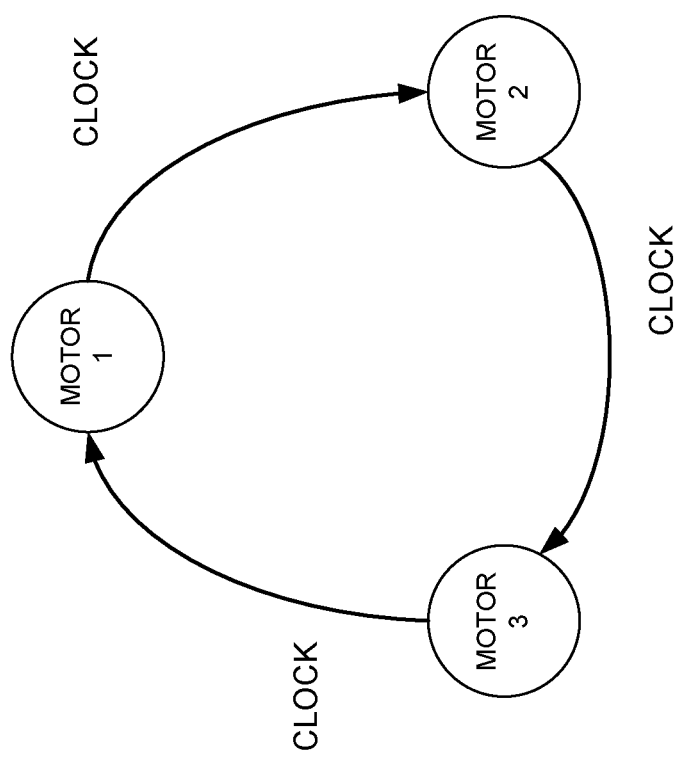
FIG. 8 illustrates a state transition diagram describing function of a state machine implemented on the field programmable gate array illustrated in FIG. 7.

In particular, the FPGA implements a current loop 304. Since the same current loop function is required for production of motor drive signals for each motor, it is an efficient use of available FPGA real estate to share a single current loop between all three motor control processes. The current loop implementation 304 is called in respect of each controlled motor, in turn. This is achieved by means of a state machine 306. As shown in FIG. 8, the state machine 306 simply cycles between three states, initiating the current loop implementation 304 in respect of each motor. The state machine 306, and thus the rate at which the FPGA executes the current loop, is governed by a clock 308, which triggers state transition in the state machine 306.

The clock 308 triggers transitions at the same rate as the ADC counter 202 of the DSP. This matches the rate of delivery of motor phase current measurements by the DSP to the FPGA.

Figure 9:
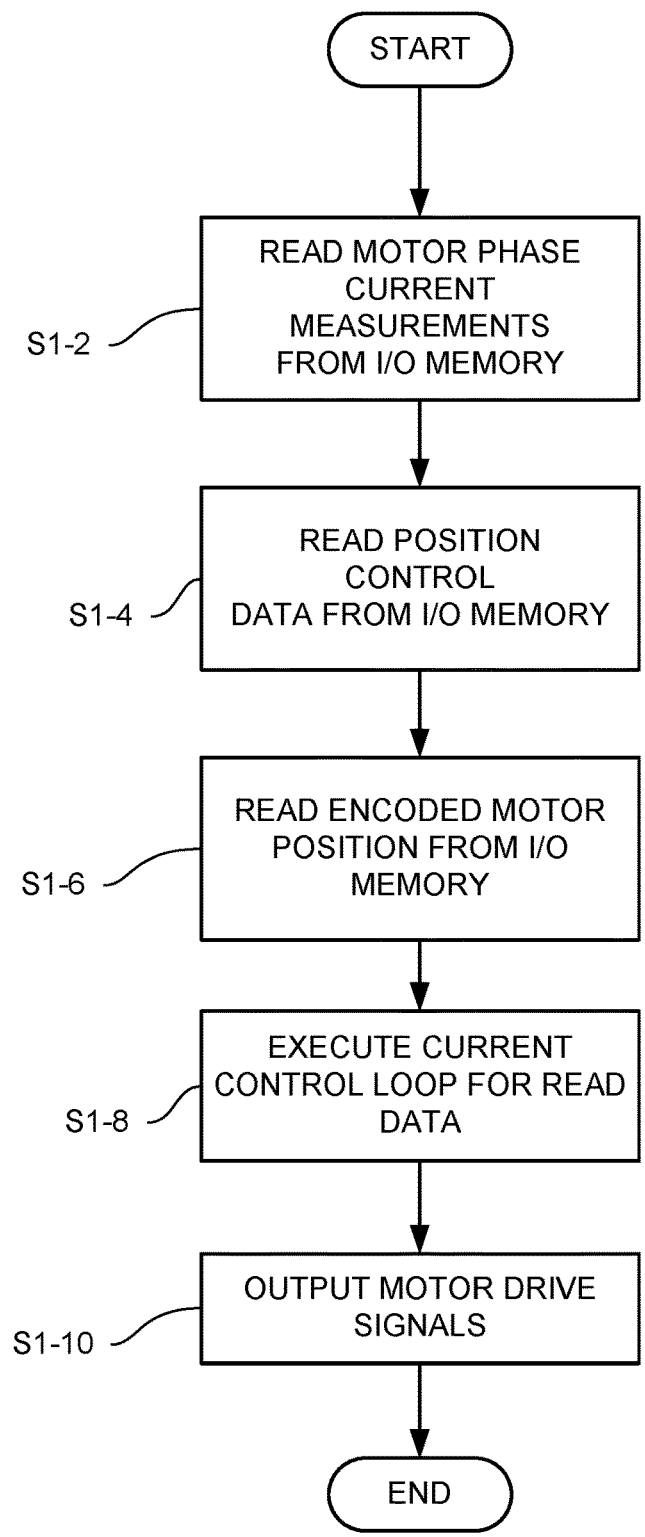
FIG. 9 illustrates a control loop function implemented on the field programmable gate array illustrated in FIG. 7.

The operation of the current loop implementation 304 is illustrated in FIG. 9. In step S1-2, the motor phase current measurements are read from the DSP interface 302. In step S1-4, the position control data are read from the DSP interface 302. In step S1-6, the encoded motor position data is read from the DSP interface 302. Then, the current loop is executed for the read data. The current loop function converts the position control data, generated by the DSP, into information from which motor drive current waveforms can be derived, which efficiently deliver desired actuation of the motors. In essence, the current loop function performs torque control of the brushless motors, since torque is directly proportional to the quadrature currents of the motors. Typical current loop functions are widely known in the field.

Then, the resultant motor drive signals are output, in step S1-10.

In summary, therefore, the FPGA 52 acts as a co-processor to the DSP 42, connected to the DSP via a memory mapped interface which allows data to be transferred to and from the FPGA at little cost in logic elements or DSP overhead.

It is desirable for the FPGA 52 to run the current loop at a higher speed than the position loop, to maximise system bandwidth and disturbance rejection capability. In this example, the current loop is executed at a rate 5 times higher than the position loop, though it is envisaged that a rate 10 times higher would also be possible. Loop times less than 50 microseconds would be desirable.

In effect, the FPGA provides a high bandwidth torque control loop. This enables fast and precise position response of the controlled brushless motors. The FOC algorithm implemented in the current loop is mathematically intensive and, if it were attempted to implement this on a DSP, this would place considerable demand on the DSP to complete the real-time execution of the loops and process all of the peripherals within the allocated time period. Instead, in the described embodiment, three distinct current loops are run in parallel without the time sharing limitation that would be imposed by the sequential architecture of the DSP.

Implementation of the current loop algorithm on the FPGA requires conversion of the algorithm to a fixed point representation. Consideration then needs to be given to the architectural design that best harnesses the resources of the FPGA. Naturally, this will, to some extent, depend on the exact characteristics of the particular FPGA employed, though some general principles exist.

As noted above, current loop control can be achieved for three motors by switching three sets of values through a single implementation of the algorithm. Although an FPGA may well be capable of performing several sets of calculations within the required time constraints, it may be an inefficient use of limited FPGA resources to create three instances of the same algorithm on a single chip. Using a state machine allows the motors to be controlled concurrently, to operate the algorithm three times in succession with inputs for each of the 3 motors. The state machine uses a memory mapped DSP interface to read in inputs and to write out the results of each computation.

As will be appreciated, the control structure implemented in the FPGA enables expansion, so the design can be altered in due course should the need arise to control more than three motors.

Since mapping an application onto a FPGA in an optimised manner requires substantially more development effort than mapping the same application onto a DSP, it is desirable to allocate, to the FPGA, operational tasks which are unlikely to require substantial alteration if system requirements change.

Implementing the current loop algorithm on the FPGA in this way enables reconfiguration of the system, without wholesale alteration of the 'firmware' implemented on the FPGA. In particular, it is possible that alterations to the controlled electromechanical devices might require variation of the gains for the PI current controller and the number of magnetic poles on the motor. By using registers in the memory mapped interface between the DSP and FPGA, configuration values for these parameters could be easily changed without having to rebuild the firmware. The current control loop on the FPGA then appears as a 'black-box' module to other developers requiring multi-axis motion control on a single chip.

In contrast, it may well be necessary to make significant changes to the structure of the position controller to accommodate the bandwidth requirements of the guidance and control algorithms. By placing implementation of the position control algorithm on the DSP, this algorithm can be altered as required, taking advantage of the flexibility by which DSPs can be reprogrammed.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

The invention claimed is:

1. A controller for controlling a plurality of electronically commutated motors, comprising a control unit and a power unit,
   the power unit comprising:
      a motor phase current sampler operable to provide, to the control unit, motor phase current samples from motor phase currents of the motors;
      a motor position encoder operable to provide, to the control unit, encoded motor position data for angular positions of the motors; and
      a plurality of drivers, each driver being operable to generate commutation signals, on the basis of respective motor driving current signals,
   the control unit comprising:
      a digital signal processor, DSP, and
      a field programmable gate array, FPGA, having an input memory mapped to the DSP,
      the DSP being operable to determine motor repositioning signals, on the basis of a received motor position demand signal describing demanded motor positions and the encoded motor position data, and to load the motor repositioning signals into the input memory of the FPGA, and
      the FPGA being operable to execute a current control algorithm by converting the motor repositioning signals generated by the DSP into information from which motor driving current signals can be derived and generate motor driving current signals for driving said motors into said demanded motor positions, on the basis of the motor repositioning signals and the motor phase current samples, and to output said motor driving current signals to the power unit.

2. A controller in accordance with claim 1 wherein the DSP further comprises an analogue to digital converter, ADC, operable to convert said motor phase current samples into motor phase current measurements, and to load said motor phase current measurements into said input of said FPGA, and wherein said FPGA is operable to generate said motor driving current signals further on the basis of the motor phase current measurements.

3. A controller in accordance with claim 1 wherein the DSP comprises a position loop counter operable to determine a processing speed for the determining of motor positioning signals, and wherein the FPGA comprises a clock operable to determine a processing speed for the determining of motor driving current signals, the processing speed for the FPGA being greater than the processing speed for the DSP.

4. A controller in accordance with claim 3 wherein the processing speed for the FPGA is at least 5 times greater than the processing speed for the DSP.

5. A controller in accordance with claim 1 wherein the FPGA is operable to establish a respective process for the generation of motor driving current signals for each controlled motor, the FPGA further comprising a state machine operable to switch between processes per motor.

6. A controller in accordance with claim 5 wherein the FPGA defines a current signal processing unit, and wherein, in use, the current signal processing unit is utilised, sequentially, by the state machine in respect of each controlled motor.

7. A controller in accordance with claim 1 wherein the power unit comprises a power supply regulator operable to receive a power supply from a source of electrical power and to present, to the control unit, a regulated power supply.

8. A method of controlling a plurality of electronically commutated motors, comprising a control process and a power process;

the power process comprising:
    providing, to the control process, motor phase current samples from motor phase currents of the motors;
    providing, to the control process, encoded motor position data for angular positions of the motors; and
    generating, for each controlled motor, commutation signals, on the basis of respective motor driving current signals, the control process comprising:
    mapping an input memory of a field programmable gate array, FPGA, to a digital signal processor, DSP,
    determining, by the DSP, motor repositioning signals, on the basis of a received motor position demand signal describing demanded motor positions and the encoded motor position data, and loading the motor repositioning signals into the input memory of the FPGA, and
    executing, by the FPGA a current control algorithm by converting the motor repositioning signals generated by the DSP into information from which motor driving current signals can be derived, and generating motor driving current signals to drive the motors into the demanded motor positions, on the basis of the motor repositioning signals and the motor phase current samples, and outputting the motor driving current signals to the power process.

* * * * *